(12) United States Patent
Moorti et al.

(10) Patent No.: US 8,971,304 B2
(45) Date of Patent: Mar. 3, 2015

(54) REDUCED INTERFRAME SPACING IN A WIRELESS TRANSMISSION SYSTEM

(71) Applicant: Broadcom Corporation, Irvine, CA (US)

(72) Inventors: Rajendra Tushar Moorti, Mountain View, CA (US); Matthew James Fischer, Mountain View, CA (US); George Kondylis, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 245 days.

(21) Appl. No.: 13/690,907

(22) Filed: Nov. 30, 2012

(65) Prior Publication Data

US 2013/0100945 A1 Apr. 25, 2013

Related U.S. Application Data

(63) Continuation of application No. 13/450,754, filed on Apr. 19, 2012, now Pat. No. 8,355,390, which is a continuation of application No. 11/558,893, filed on Nov. 10, 2006, now Pat. No. 8,194,626.

(60) Provisional application No. 60/735,506, filed on Nov. 11, 2005.

(51) Int. Cl.
*G08C 15/00* (2006.01)
*H04L 5/14* (2006.01)
*H04W 72/04* (2009.01)
*H04W 28/06* (2009.01)
*H04W 28/18* (2009.01)

(52) U.S. Cl.
CPC .............. *H04W 72/04* (2013.01); *H04W 28/06* (2013.01); *H04W 28/18* (2013.01)
USPC .......................... 370/338; 370/230; 370/294

(58) Field of Classification Search
CPC ..... H04W 72/04; H04W 84/12; H04W 28/06; H04W 28/04; H04L 1/1614; H04J 3/24
USPC ............. 370/338, 329, 230, 252, 328; 710/30
See application file for complete search history.

(56) References Cited

U.S. PATENT DOCUMENTS

| 2005/0135284 | A1* | 6/2005 | Nanda et al. ................... 370/294 |
| 2005/0181800 | A1* | 8/2005 | Trachewsky et al. ....... 455/452.1 |
| 2006/0034248 | A1* | 2/2006 | Mishra et al. ................. 370/349 |
| 2006/0050709 | A1* | 3/2006 | Sung et al. .................... 370/394 |
| 2007/0076675 | A1* | 4/2007 | Chen ............................. 370/338 |
| 2007/0201364 | A1* | 8/2007 | Nakajima et al. ............. 370/230 |

* cited by examiner

*Primary Examiner* — Nizar Sivji
(74) *Attorney, Agent, or Firm* — Garlick & Markison; Kevin L. Smith

(57) ABSTRACT

Providing wireless transmission, where in a first transmission mode, transmitting a plurality of frames using a first interframe spacing interval. When in a second transmission mode, transmitting the plurality of frames using a second interframe spacing interval, wherein the second interframe spacing is less than the first interframe spacing.

20 Claims, 10 Drawing Sheets

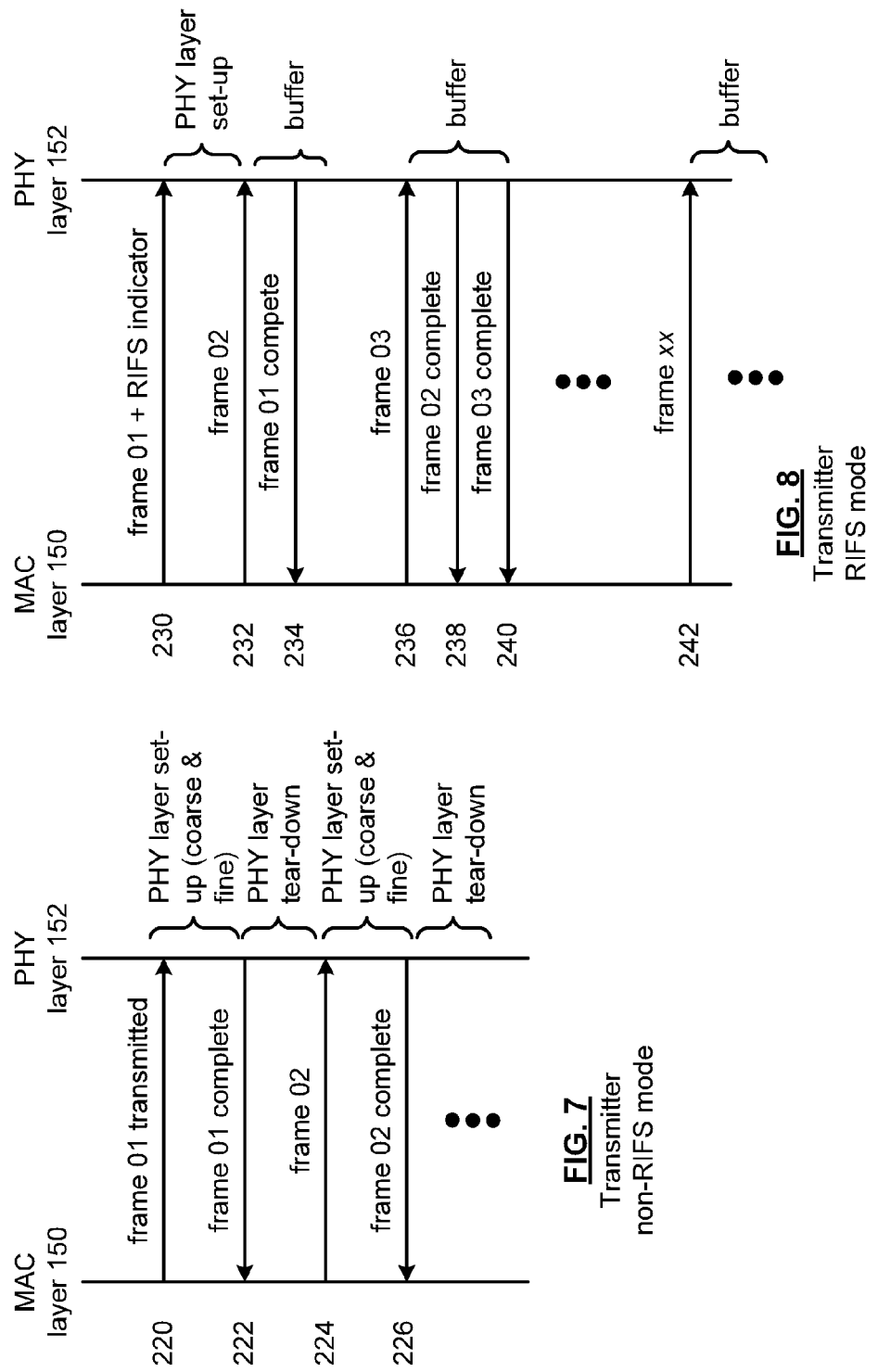

signaling/frames 151

REDUCED INTERFRAME SPACING IN A WIRELESS TRANSMISSION SYSTEM

CROSS REFERENCE TO RELATED APPLICATIONS

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:

1. U.S. Utility application Ser. No. 13/450,754, entitled "REDUCED INTERFRAME SPACING IN A WIRELESS TRANSMISSION SYSTEM," filed Apr. 19, 2012, issued as U.S. Pat. No. 8,355,390, on Jan. 15, 2013, which claims priority pursuant to 35 U.S.C. §120, as a continuation, to the following U.S. Utility patent application which is hereby incorporated herein by reference in its entirety and made part of the present U.S. Utility patent application for all purposes:

2. U.S. Utility application Ser. No. 11/558,893, entitled "REDUCED INTERFRAME SPACING IN A WIRELESS TRANSMISSION SYSTEM," filed Nov. 10, 2006, issued as U.S. Pat. No. 8,194,626, on Jun. 5, 2012, which claims priority pursuant to 35 U.S.C. §119(e) to the following U.S. Provisional Patent Application which is hereby incorporated herein by reference in its entirety and made part of the present U.S. Utility patent application for all purposes:

a. U.S. Provisional Application Ser. No. 60/735,506 entitled "Reduced Interframe Spacing in a Wireless LAN Transmission," filed Nov. 11, 2005.

SPECIFICATION

1. Technical Field

The present invention relates to wireless communications and, more particularly, to improved frame throughput and system efficiency.

2. Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (for example, one of a plurality of radio frequency (RF) carriers of the wireless communication system) and communicate over that channel(s). For indirect wireless communications, each wireless communication device communicates directly with an associated base station (for example, for cellular services) and/or an associated access point (for example, for an in-home or in-building wireless network) via an assigned channel. To complete a communication connection between the wireless communication devices, the associated base stations and/or associated access points communicate with each other directly, via a system controller, via a public switch telephone network (PSTN), via the Internet, and/or via some other wide area network.

Each wireless communication device includes a built-in radio transceiver (that is, receiver and transmitter) or is coupled to an associated radio transceiver (for example, a station for in-home and/or in-building wireless communication networks, RF modem, etc.). As is known, the transmitter includes a data modulation stage, one or more intermediate frequency stages, and a power amplifier stage. The data modulation stage converts raw data into baseband signals in accordance with the particular wireless communication standard. The one or more intermediate frequency stages mix the baseband signals with one or more local oscillations to produce RF signals. The power amplifier stage amplifies the RF signals prior to transmission via an antenna.

Typically, the data modulation stage is implemented on a baseband processor chip, while the intermediate frequency (IF) stages and power amplifier stage are implemented on a separate radio processor chip. Historically, radio integrated circuits have been designed using bi-polar circuitry, allowing for large signal swings and linear transmitter component behavior. One common problem is the overhead associated with processing and transmission of frames. Generally, in addition to the data contents of a frame, physical (PHY) layer and medium access control (MAC) layer information is appended for transceiver processing and handling of the frames. Additional time and processing time is spent acknowledging and providing setups at the receiver for each frame and/or fragment. What is needed, therefore, is a frame operation for increased throughput of a plurality of frames as data transmission event.

BRIEF DESCRIPTION OF THE DRAWINGS

A better understanding of the present invention can be obtained when the following detailed description of the preferred embodiment is considered with the following drawings, in which:

FIG. 7 illustrates a transmission communication handshake of a transmitter in a first transmission mode according to one embodiment of the invention;

FIG. 8 illustrates a transmission communication handshake of a transmitter in a second transmission mode according to one embodiment of the invention;

DETAILED DESCRIPTION OF THE DRAWINGS

Figure 1:
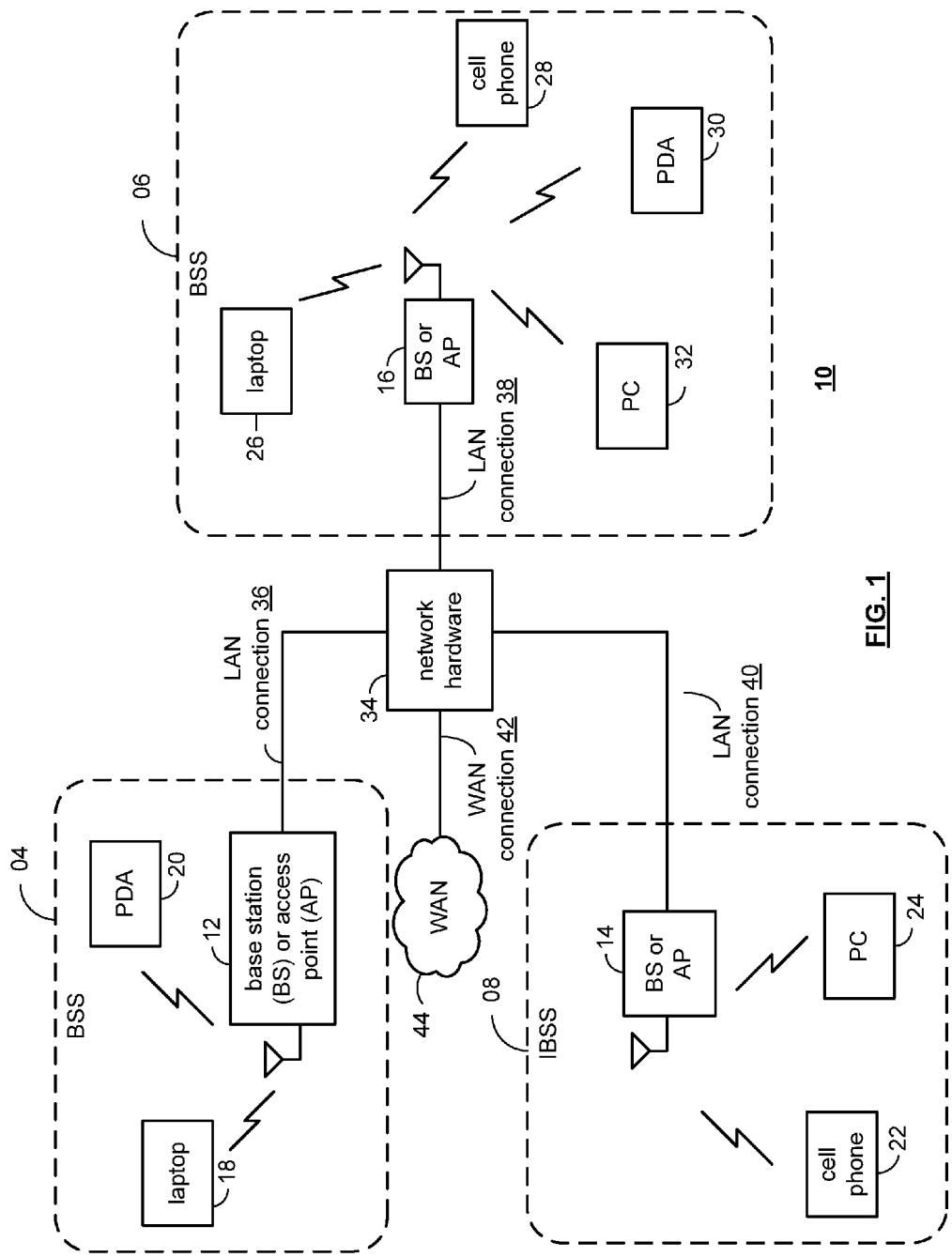
FIG. 1 is a functional block diagram illustrating a communication system that includes circuit devices and network elements and operation thereof according to one embodiment of the invention.

FIG. 1 is a functional block diagram illustrating a communication system that includes circuit devices and network elements and operation thereof according to one embodiment of the invention. More specifically, a plurality of network service areas 04, 06 and 08 are a part of a network 10. Network 10 includes a plurality of base stations or access points (APs) 12-16, a plurality of wireless communication devices 18-32 and a network hardware component 34. The wireless communication devices 18-32 may be laptop computers 18 and 26, personal digital assistants 20 and 30, personal computers 24 and 32 and/or cellular telephones 22 and 28. The details of the wireless communication devices will be described in greater detail with reference to FIGS. 2 through 11.

The base stations or APs 12-16 are operably coupled to the network hardware component 34 via local area network (LAN) connections 36, 38 and 40. The network hardware component 34, which may be a router, switch, bridge, modem, system controller, etc., provides a wide area network (WAN) connection 42 for the communication system 10 to an external network element such as WAN 44. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (that is, point-to-point communications), wireless communication devices communicate directly via an allocated channel.

Typically, base stations are used for cellular telephone systems and like-type systems, while access points are used for in-home or in-building wireless networks and increasingly, for outdoor and public-space "hot spots." Regardless of the particular type of communication system, each wireless communication device includes a built-in radio and/or is coupled to a radio. In general, higher data throughput can be recognized by reducing the length of interframe spacing intervals between transmitted frames and/or fragments, and by suppressing acknowledgment responses (that is, completely suppressing responses, delaying those responses and potentially grouping and/or otherwise aggregating the delayed responses) from a receiving or destination station. As an example, a wireless communication device such as laptop 26 can provide transmissions in a first transmission mode utilizing conventional interframe spacing intervals for wireless transmission functions, and a second transmission mode utilizing a reduced interframe spacing interval to increase frame throughput (and correspondingly, data throughput) to a destination station, for example, the base station or access point 16 and or wireless communication devices, for example, laptop 26, cell phone 28, PDA 30, and/or PC 32. Further to this example, the laptop 26 suppresses acknowledgment responses (in response to received frame transmissions) from the access point 16, further decreasing the time used to transmit frames, and associated data, to the access point 16. The increased data throughput resulting from reduced transmission intervals and/or acknowledgement suppression is discussed in detail regarding FIGS. 2 through 11.

Figure 2:
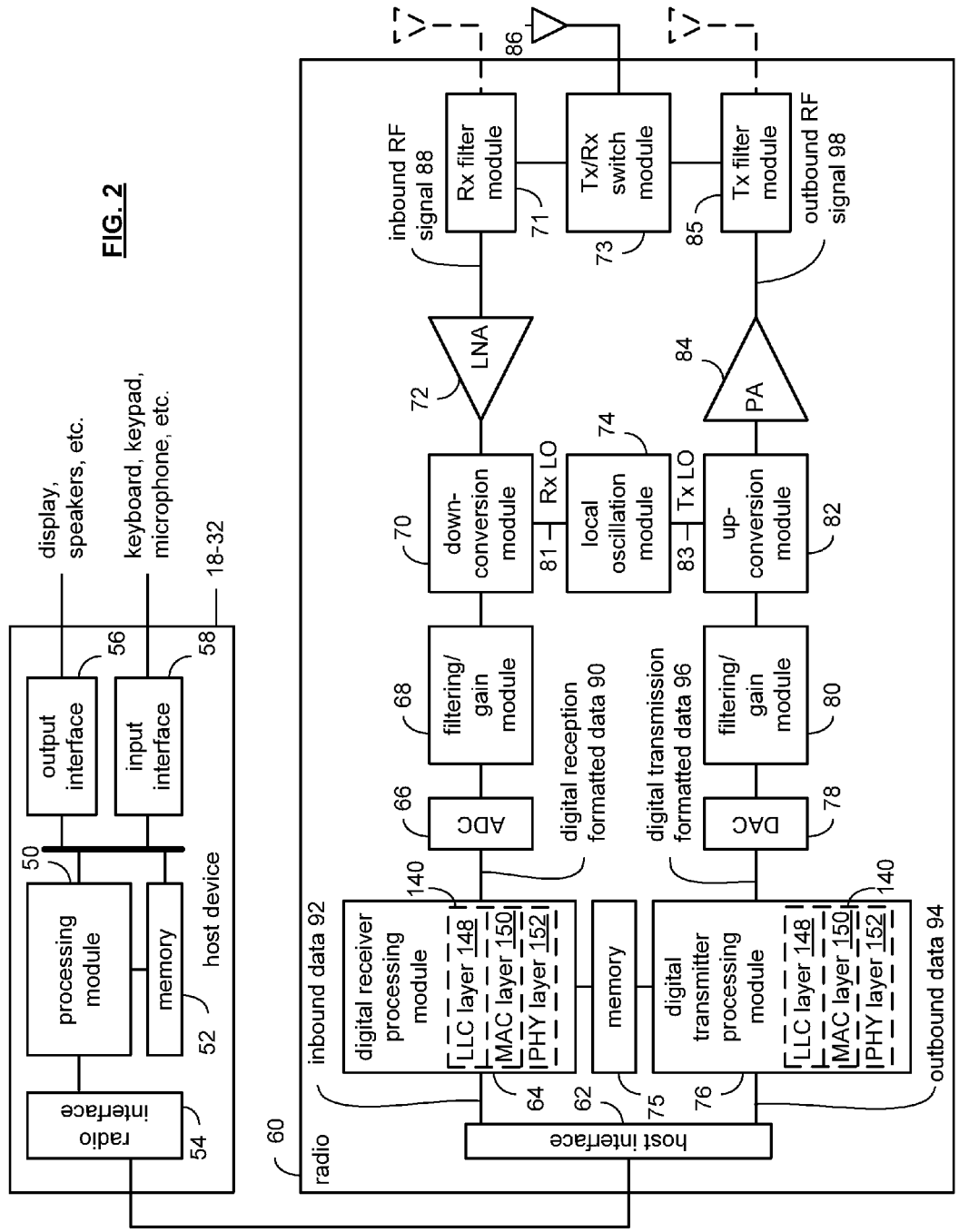
FIG. 2 is a schematic block diagram illustrating a wireless communication host device and an associated radio.

FIG. 2 is a schematic block diagram illustrating a wireless communication host device 18-32 and an associated radio 60. For cellular telephone hosts, radio 60 is a built-in component. For personal digital assistants hosts, laptop hosts, and/or personal computer hosts, the radio 60 may be built-in or an externally coupled component.

As illustrated, wireless communication host device 18-32 includes a processing module 50, a memory 52, a radio interface 54, an input interface 58 and an output interface 56. Processing module 50 and memory 52 execute the corresponding instructions that are typically done by the host device. For example, for a cellular telephone host device, processing module 50 performs the corresponding communication functions in accordance with a particular cellular telephone standard.

Radio interface 54 allows data to be received from and sent to radio 60. For data received from radio 60 (for example, inbound data), radio interface 54 provides the data to processing module 50 for further processing and/or routing to output interface 56. Output interface 56 provides connectivity to an output device such as a display, monitor, speakers, etc., such that the received data may be displayed. Radio interface 54 also provides data from processing module 50 to radio 60. Processing module 50 may receive the outbound data from an input device such as a keyboard, keypad, microphone, etc., via input interface 58 or generate the data itself. For data received via input interface 58, processing module 50 may perform a corresponding host function on the data and/or route it to radio 60 via radio interface 54.

Radio 60 includes a host interface 62, a digital receiver processing module 64, an analog-to-digital converter 66, a filtering/gain module 68, a down-conversion module 70, a low noise amplifier 72, a receiver filter module 71, a transmitter/receiver (Tx/Rx) switch module 73, a local oscillation module 74, a memory 75, a digital transmitter processing module 76, a digital-to-analog converter 78, a filtering/gain module 80, an up-conversion module 82, a power amplifier 84, a transmitter filter module 85, and an antenna 86 operatively coupled as shown. The antenna 86 is shared by the transmit and receive paths as regulated by the Tx/Rx switch module 73. The antenna implementation will depend on the particular standard to which the wireless communication device is compliant.

Digital receiver processing module 64 and digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, and modulation. The digital receiver processing module 64 and the digital transmitter processing module 76, in combination with operational instructions stored in memory 75, implement a protocol stack 140, which is generally based upon the Open Systems Interconnection ("OSI") model. Through the medium access control ("MAC") layer 150 and the physical (PHY) layer 152, the radio 60 can provide reduced interframe spacing ("RIFS") to increase the data rate transfer rate with a destination station. Implementing a transmission mode utilizing RIFS intervals through the interaction of the MAC layer 150 and the PHY layer 152 will be discussed in detail with reference to FIGS. 4 through 11.

Digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions and/or signals.

Memory 75 may be a single memory device or a plurality of memory devices. Such a memory device may be a read-only memory, random access memory, volatile memory, non-volatile memory, static memory, dynamic memory, flash memory, and/or any device that stores digital information. Note that when digital receiver processing module 64 and/or digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Memory 75 stores, and digital receiver processing module 64 and/or digital transmitter processing module 76 executes, operational instructions corresponding to at least some of the functions illustrated herein.

In operation, radio 60 receives outbound data 94 from wireless communication host device 18-32 via host interface 62. Host interface 62 routes outbound data 94 to digital transmitter processing module 76, which processes outbound data 94 in accordance with a particular wireless communication standard or protocol (for example, IEEE 802.11(a), IEEE 802.11b, Bluetooth, etc.) to produce digital transmission formatted data 96. Digital transmission formatted data 96 will be a digital baseband signal or a digital low IF signal, where the low IF typically will be in the frequency range of one hundred kilohertz to a few megahertz.

Digital-to-analog converter 78 converts digital transmission formatted data 96 from the digital domain to the analog domain. Filtering/gain module 80 filters and/or adjusts the gain of the analog baseband signal prior to providing it to up-conversion module 82. Up-conversion module 82 directly converts the analog baseband signal, or low IF signal, into an RF signal based on a transmitter local oscillation 83 provided by local oscillation module 74. Power amplifier 84 amplifies the RF signal to produce an outbound RF signal 98, which is filtered by transmitter filter module 85. The antenna 86 transmits outbound RF signal 98 to a targeted device such as a base station, an access point and/or another wireless communication device.

Radio 60 also receives an inbound RF signal 88 via antenna 86, which was transmitted by a base station, an access point, or another wireless communication device. The antenna 86 provides inbound RF signal 88 to receiver filter module 71 via Tx/Rx switch module 73, where Rx filter module 71 bandpass filters inbound RF signal 88. The Rx filter module 71 provides the filtered RF signal to low noise amplifier 72, which amplifies inbound RF signal 88 to produce an amplified inbound RF signal. Low noise amplifier 72 provides the amplified inbound RF signal to down-conversion module 70, which directly converts the amplified inbound RF signal into an inbound low IF signal or baseband signal based on a receiver local oscillation 81 provided by local oscillation module 74. Down-conversion module 70 provides the inbound low IF signal or baseband signal to filtering/gain module 68. Filtering/gain module 68 may be implemented in accordance with the teachings of the present invention to filter and/or attenuate the inbound low IF signal or the inbound baseband signal to produce a filtered inbound signal.

Analog-to-digital converter 66 converts the filtered inbound signal from the analog domain to the digital domain to produce digital reception formatted data 90. Digital receiver processing module 64 decodes, descrambles, demaps, and/or demodulates digital reception formatted data 90 to recapture inbound data 92 in accordance with the particular wireless communication standard being implemented by radio 60. Host interface 62 provides the recaptured inbound data 92 to the wireless communication host device 18-32 via radio interface 54.

As one of average skill in the art will appreciate, the wireless communication device of FIG. 2 may be implemented using one or more integrated circuits. For example, the host device may be implemented on a first integrated circuit, while digital receiver processing module 64, digital transmitter processing module 76 and memory 75 may be implemented on a second integrated circuit, and the remaining components of radio 60, less antenna 86, may be implemented on a third integrated circuit. As an alternate example, radio 60 may be implemented on a single integrated circuit. As yet another example, processing module 50 of the host device and digital receiver processing module 64 and digital transmitter processing module 76 may be a common processing device implemented on a single integrated circuit.

Memory 52 and memory 75 may be implemented on a single integrated circuit and/or on the same integrated circuit as the common processing modules of processing module 50, digital receiver processing module 64, and digital transmitter processing module 76.

Local oscillation module 74 includes circuitry for adjusting an output frequency of a local oscillation signal provided therefrom. Though it is not shown here in FIG. 2, in one embodiment of the invention, local oscillation module 74 receives a frequency correction input that it uses to adjust an output local oscillation signal to produce a frequency corrected local oscillation signal output. While local oscillation module 74, up-conversion module 82 and down-conversion module 70 are implemented to perform direct conversion between baseband and RF, it is understood that the principles herein may also be applied readily to systems that implement an intermediate frequency conversion step at a low intermediate frequency prior to conversion to a baseband frequency.

Figure 3:
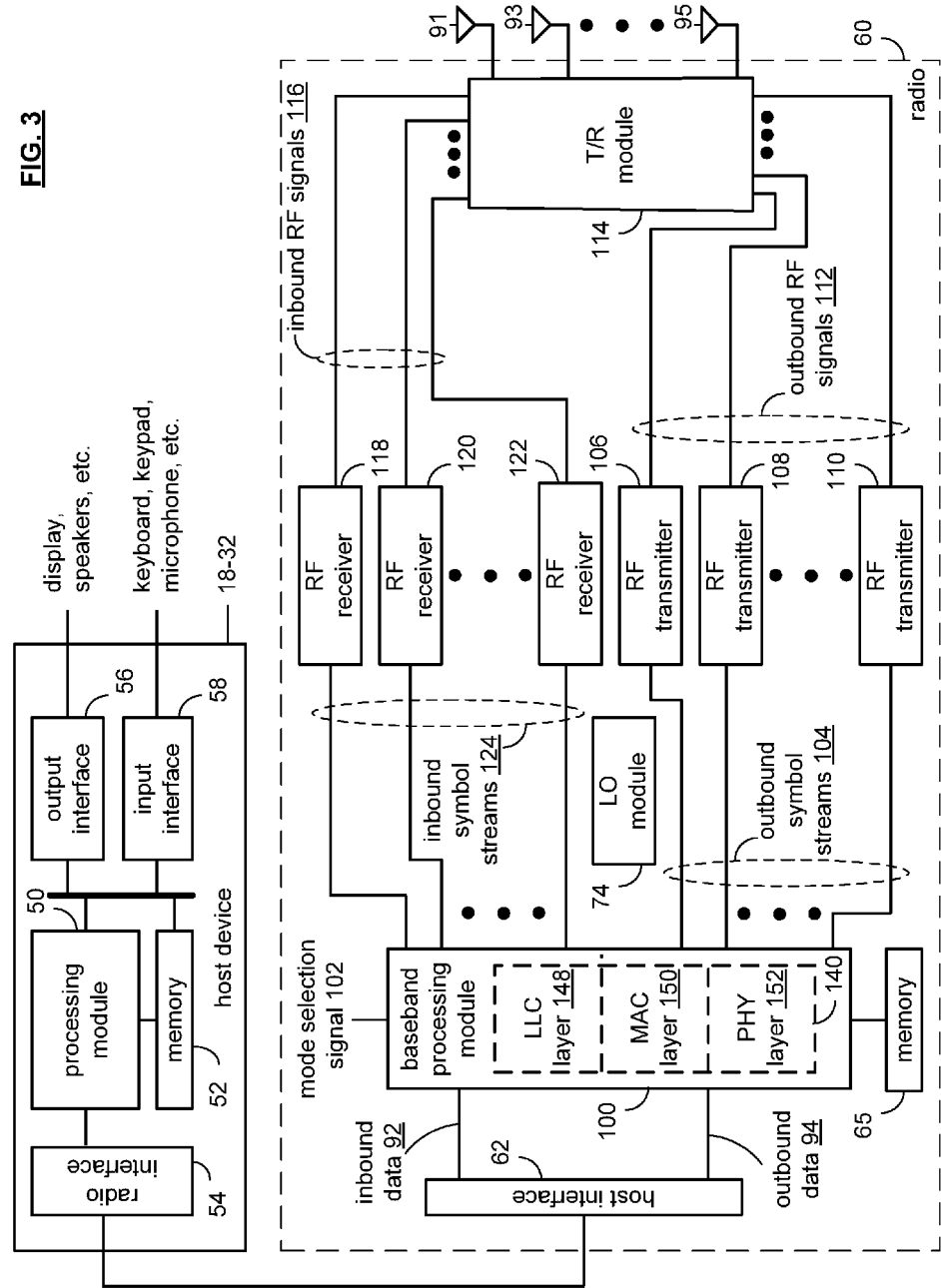
FIG. 3 is a schematic block diagram illustrating a wireless communication device that includes a host device and an associated radio.

FIG. 3 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (for example, inbound data), the radio interface 54 provides the data to the processing module 50 for further processing and/or routing to the output interface 56. The output interface 56 provides connectivity to an output display device such as a display, monitor, speakers, etc., such that the received data may be displayed. The radio interface 54 also provides data from the processing module 50 to the radio 60. The processing module 50 may receive the outbound data from an input device such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 91-95, a plurality of RF receivers 118-120, and a local oscillation module 74. The baseband processing module 100, in combination with operational instructions stored in memory 65, executes digital receiver functions and digital transmitter functions, respectively.

The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion.

The baseband processing module 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

The baseband processing module 100, in combination with operational instructions stored in the memory 65, implement a protocol stack 140, which is generally based upon the Open Systems Interconnection ("OSI") model. The protocol stack 140 includes the logical link control ("LLC") layer 148 and the medium access control ("MAC") layer 150, and a physical (PHY) layer 152. Through the MAC layer 150 and the PHY layer 152, the radio 60 can provide reduced interframe spacing ("RIFS") intervals to increase the data transfer rate with a destination station. Implementing a RIFS through the interaction of the signaling/frames 151 of the MAC layer 150 and the PHY layer 152 will be discussed in detail with reference to FIGS. 4 through 11. In general, with an RIFS interval, increased efficiency of frame and/or fragment transfer from the MAC layer 150 to the PHY layer 152 is realized by sustaining the configuration of the PHY layer 152 for subsequent frames, and providing subsequent frames without having received a "complete" message, which advises that the provided frame is over-the-air, from the PHY layer 152 beforehand.

In operation, the radio 60 receives outbound data 94 from the host device via the host interface 62. The baseband processing module 100 receives the outbound data 94 and, based on a mode selection signal 102, produces one or more outbound symbol streams 104. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal 102 will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode selection signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode selection signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode selection signal 102 indicates two, three, or four antennas, the baseband processing module 100 will produce two, three, or four outbound symbol streams 104 from the outbound data 94.

Depending on the number of outbound symbol streams 104 produced by the baseband processing module 100, a corresponding number of the RF transmitters 106-110 will be enabled to convert the outbound symbol streams 104 into outbound RF signals 112. In general, each of the RF transmitters 106-110 includes a digital filter and upsampling module, a digital-to-analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 91-95.

When the radio 60 is in the receive mode, the transmit/receive module 114 receives one or more inbound RF signals 116 via the antennas 91-95 and provides them to one or more RF receivers 118-122. The RF receiver 118-122 converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 3 may be implemented using one or more integrated circuits. For example, the host device may be implemented on a first integrated circuit, the baseband processing module 100 and memory 65 may be implemented on a second integrated circuit, and the remaining components of the radio 60, less the antennas 91-95, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4:
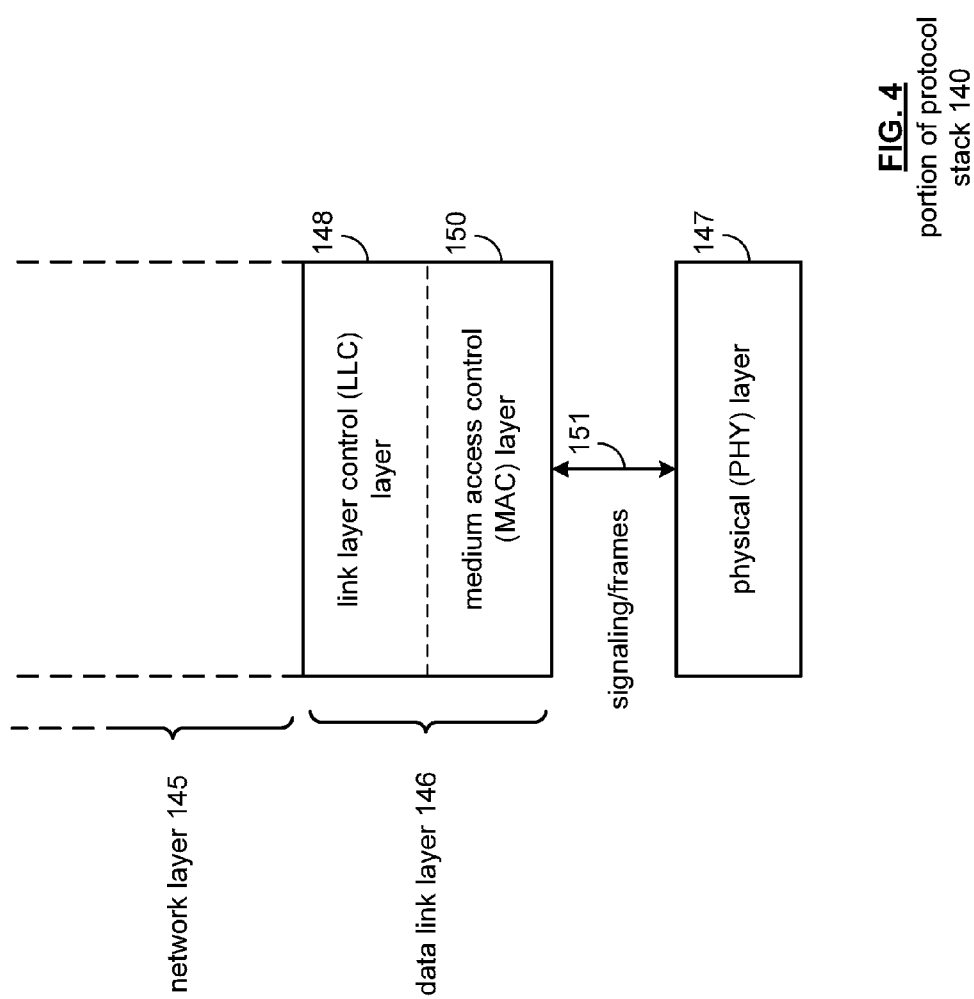
FIG. 4 illustrates a protocol stack of a transmitter according to one embodiment of the present invention.

FIG. 4 illustrates a portion of a protocol stack 140, which is based upon the OSI model. The protocol stack 140 includes a physical layer 152, a data link layer 146, and a network layer 145. Additional layers, such as the transport layer and the application layer, are included above the network layer as indicated by the dashed lines, but for the sake of clarity they are not discussed further herein. The data link layer includes a link layer control ("LLC") layer 148 and a medium access control ("MAC") layer 150. The RIFS mode is implemented with respect to the signaling/frames 151 communications between the MAC layer 150 and the PHY layer 152.

According to one embodiment of the invention, a transmission mode increases frame and/or fragment throughput to a destination station by minimizing the tear-down/setup of the PHY layer 152 and decreasing the time between frame transfers from the MAC layer 150 to the PHY layer 152 to realize a reduced interframe spacing interval.

The LLC layer 148 operates to hide the differences between the various kinds of 802 networks by providing a single format and interface to the network layer 145. This format, interface, and protocol are based upon the high-level data link control ("HDLC") protocol. The LLC layer 148 forms the upper portion of the data link layer 146. In operation, the network layer 145 uses LLC access primitives to pass a packet to the LLC layer 148. The LLC layer 148 adds an LLC header, containing sequence and acknowledgement numbers, which is passed to the MAC layer 150. The MAC layer 150 functions include channel access procedures, protocol data unit ("PDU") addressing, frame formatting, error checking, and fragmentation and reassembly. The MAC layer 150 passes MAC protocol data units ("MPDU") to the PHY layer 152, which transmits the MPDU across a channel to destination station.

The PHY layer 152 provides digital baseband transmission processes based upon configuration signals from the MAC layer 150. The PHY layer 152 attends to the transmission of the raw bit stream, defining parameters such as data rates, modulation method, signaling parameters, transmitter/receiver synchronization, etc. Within the radio 60, the PHY layer 152 corresponds to the analog or time-domain radio front end and the digital baseband signal processing section (such as the digital transmitter processing module 76 and/or the baseband processing module 100).

The MAC layer 150 and the PHY layer 152 may be implemented by a digital transmitter processing module 76 and operational instructions stored in a memory 75 (see FIG. 2) and/or in a baseband processing module 100 (see FIG. 3). The processing modules 76 and 100 may be implemented in logic, in operation instructions via software, or a combination of technologies to accommodate timing and/or response requirements of the MAC layer 150 and the PHY layer 152, as well as those of the radio 60 in general.

As an example, timing-critical functions for the MAC layer 150 include those functions demanding fast responses or precision timing, such as cyclical redundancy code ("CRC") generation and checking, hardware-level frame retry, channel access, timer updates, and generation of special frames such as beacons, ACK (acknowledgment), CTS (clear-to-send), et cetera. With respect to the MAC layer 150, software operational instructions may prompt the processing module (such as transmitting processing module 76 and/or baseband processing module 100) to support non-timing critical functions. Examples of non-timing critical functions, within the MAC layer 150, include complex frame exchanges (such as authentication and association), fragmentation, frame buffering and bridging, et cetera. Accordingly, the layers may be implemented as a combination of logic and memory storage configured to carry out the task of the layer (that is, while data is in the digital domain).

The functional logic may be hardware, software, firmware, or a combination thereof, implemented using application specific integrated circuits ("ASIC") or systems-on-chips (where variations may include gate array ASIC design, full-custom ASIC design, structured ASIC design, et cetera), application specific standard products ("ASSP"), programmable gate array ("PGA") technologies (such as system programmable gate arrays ("SPGA"), field programmable gate arrays ("FPGA")), et cetera. Also, each layer, or a combination of all or portions of the layers, may be implemented as an integrated circuit or software program to accommodate timing and/or processing requirements, providing for RIFS-mode operation as well as other operational modes that are non-RIFS.

Figure 5:
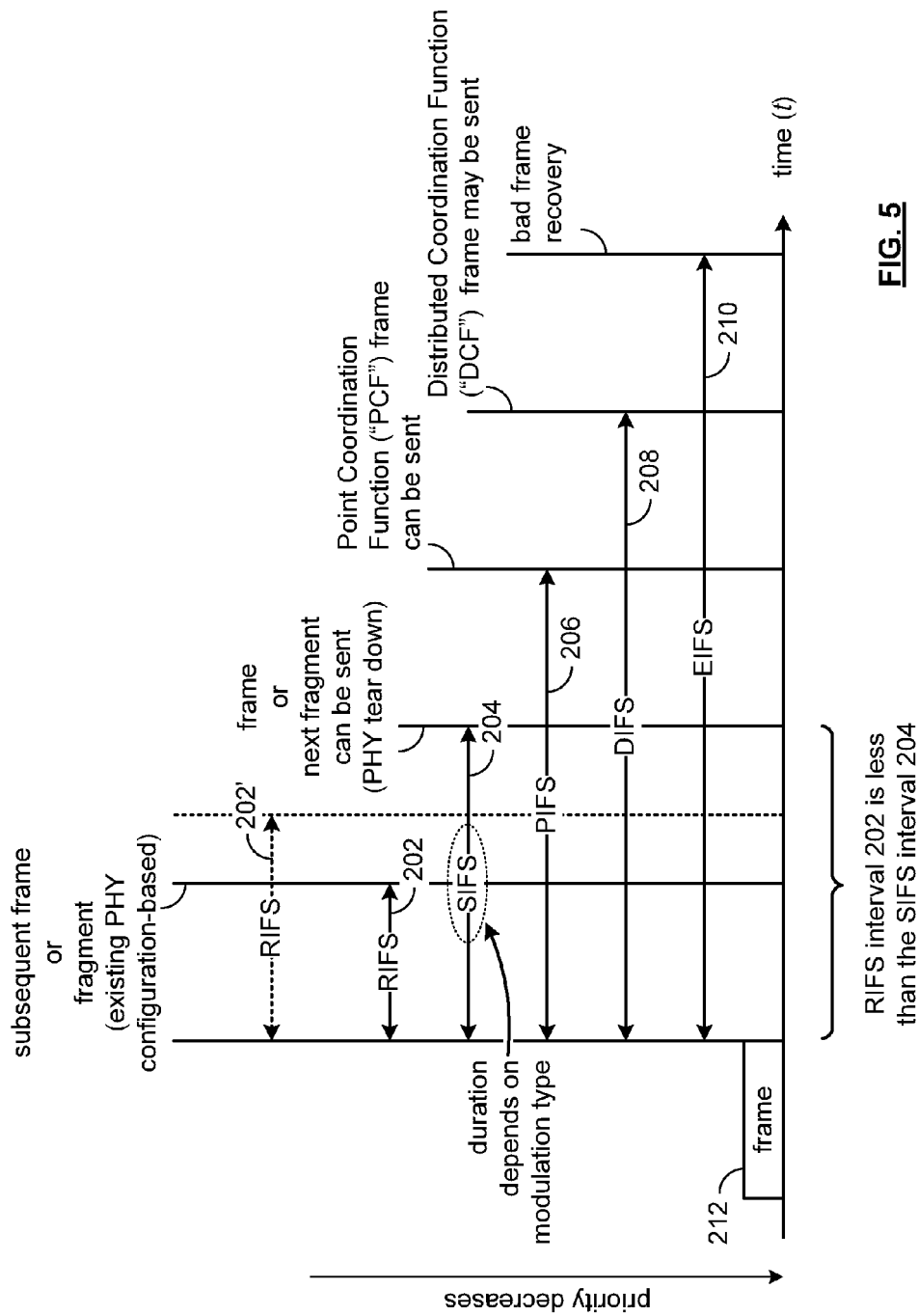
FIG. 5 illustrates a method for providing reduced interframe spacing (RIFS) according to one embodiment of the present invention.

FIG. 5 illustrates a method for providing a reduced interframe spacing ("RIFS") interval 202 in comparison to interframe spacing ("IFS") intervals 204 through 210 under the IEEE 802.11 wireless LAN specifications according to one embodiment of the invention. The actual timing between the spaces may vary, such as with respect to modulation type and permitted tolerances under applicable specifications. These spacings provide transmission operation in an RIFS transmission mode and a non-RIFS transmission mode.

In a network in which multiple devices may seek access to a base station/access point or other station, MAC layer priority schemes provide coordinated access to physical resources for different classes of service and/or different classes of stations or access points. Generally, one priority scheme is based at least partially upon interframe spacings (or time intervals) following the end of transmission of a frame.

Under the 802.11 wireless LAN specification, for example, transceivers support Point Coordination Function ("PCF") operations (such as where a base station or access point provides central control over medium access for at least some time within in a service area, such as service area 04, 06, and/or 08) and Distributed Coordination Function ("DCF") operations (that is, a base station or access point may or may not be present within the network, but the control over the medium access is determined in a distributed manner, by all stations in the network) and potentially, Hybrid Coordination Function ("HCF") operations. The Point Coordination Function relies on the access point to perform polling, enabling polled stations to transmit without contending for the wireless channel or medium. The Distributed Coordination Function is the fundamental access technique for supporting asynchronous data transfer on a best-effort basis, and operates through a Carrier Sense Multiple Access with Collision Avoidance mechanism ("CSMA/CA") where stations compete for access to the network. Under the IEEE 802.11 specification, the PCF coexists with the DCF. The HCF includes a polling function that is similar to the polling of the PCF but with more flexibility. The HCF also includes a multi-tiered classification system for multiple, parallel DCF-like coordination functions which each compete for the medium with a protocol which is essentially similar to the DCF protocol, but with possibly modified access parameters, where access parameters include, but are not limited to, minimum contention window, maximum contention window and modified interframe spacing intervals.

In support of a first transmission mode (that is, a non-RIFS modes of operation), four intervals are defined: The SIFS 204 is the shortest interval, followed by the Point Coordination Function IFS ("PIFS") interval 206, and the Distributed Coordination Function IFS ("DIFS") interval 208 and the Extended IFS ("EIFS") interval 210. Priority access to the wireless medium is controlled through the use of interframe space ("IFS") intervals between the transmissions of frames. The IFS intervals, under the specification, are mandatory periods of idle time on the transmission medium or channel. Generally, after a frame 212 is sent (that is, there is data-on-the-air), a certain amount of medium idle time is required before any station may send a frame, usually DIFS plus a random backoff under normal DCF procedures. Stations only required to wait a SIFS interval 204 have priority access over those stations required to wait a PIFS interval 206 which in turn, have a priority access over those stations required to wait for a DIFS interval 208. Exactly one station is entitled to respond with a frame or a frame fragment after the SIFS interval 204; because the SIFS is the shortest interval under the specification, the SIFS interval 204 has the highest priority of the intervals; the SIFS level of priority is always granted to exactly one station notwithstanding collisions. HCF includes additional interframe spacing intervals called AIFS [i], where each AIFS[i] is analogous to the DIFS and each is used to assist in the differentiation of the probability of allowing the transmission of frames of a different class. Each AIFS [i] value is equal to or greater than the PIFS value.

Following a transmission which grants the SIFS interval 204 priority to a receiving station, the PHY layer is "torn down" or reinitialized so that it may be re-initialized in preparation for a possible reception which is the transmission that is performed by the station that has been granted the SIFS level of priority. If that one station which has the highest priority of access fails to respond after the SIFS interval and instead, a PIFS interval 206 of medium idle time elapses, then the base station or access point, such as access points 12, 14, and/or 16 (see FIG. 1), may send a poll frame. The receipt of a poll frame allows the addressed recipient station to send a data frame or fragment sequence without other stations interfering by granting that recipient station the SIFS level of priority of access. The access point regains a new opportunity to acquire the wireless medium using the PIFS level of priority without competing with other stations when the poll frame recipient station has completed its transmissions. When a station with the SIFS level of priority remains silent, and an access point remains silent, and a DIFS interval 208 of medium idle time elapses, then any station (for example, wireless communication devices 26, 28, 30, and/or 32 of FIG. 1) may attempt to acquire the channel to send a new frame under normal DCF access procedures, provided that other conditions for the allowance of a transmission have been met by that station.

The last time interval, the EIFS (Extended InterFrame Spacing) interval 210, is used by a station that has received an errored frame or a frame employing an unknown rate or modulation in order to force that station to remain silent for a specific period of time, which in turn allows for a possible frame exchange to occur which is not interpretable by that station, usually because at least one of the frames of the frame exchange is employing a PHY rate encoding or modulation which is not interpretable by that station. A station which is employing the EIFS interval 210 has the lowest priority since that station may have lost synchronization with the virtual carrier state of the wireless medium due to its inability to properly decode MAC header duration information which is used to update the virtual carrier state as maintained by the MAC layer, and therefore the station should wait for an adequate amount of time to avoid interfering with a potentially ongoing dialog between two other stations. Reception of a subsequent frame with no error by such a station provides that station with the latest information necessary to resynchronize its virtual carrier state with the network virtual carrier state and therefore allows that station to cancel any remaining EIFS time.

While the above standards specification-based protocol satisfies its goals of coordinating communications, there are some aspects that may be improved upon to correspondingly improve network efficiencies.

In a second, or RIFS, mode of transmission, increased frame throughput and overhead reduction is realized through protocol handshake reduction and setup/teardown minimization, as compared to the processes specified with respect to non-RIFS mode intervals that include the SIFS interval 204, the PIFS interval 206, and/or the DIFS interval 208 and the EIFS interval 210. A RIFS interval is shorter than a SIFS interval in time duration. For example, the RIFS interval may vary within the interval of the SIFS interval 204, such as the RIFS interval 202', and be less than the SIFS interval 204. Further, the duration of the SIFS interval 204 is dependent on several parameters, such as modulation type (for example, Complementary Code Keying (CCK) or Orthogonal Frequency Division Multiplexing (OFDM)) and network propagation delay time. That is, the length or duration of the SIFS interval is dependent upon the modulation type and the expected network propagation delay and the expected time required to process an incoming received signal from another transmitter and the expected time required by a transceiver to change operational mode from one of receiving a frame to one of transmitting a frame. Because the RIFS interval does not require a transceiver to stop receiving and then start transmitting, it follows that the duration of a RIFS interval is similarly adjustable to be less than the duration of a present SIFS interval.

To implement increased data throughput and reduced transmitter overhead, the reduced interframe spacing (RIFS) interval 202 is less than the SIFS interval 204, and a transmitter in a RIFS-mode does not expect an ACK frame or other response transmission from a destination station within a SIFS interval time span of having sent the transmission. Furthermore, for the frames and/or fragments forming the communication with a destination station, the existing PHY layer configuration is used for the duration of the transmission so that a teardown/set-up process is not required between transmissions which are separated by a RIFS interval. Generally, when operating in a RIFS mode, the existing PHY layer configuration of the transmitter is sustained to reduce setup-time overhead. In this manner, efficiency and throughput are improved by the reduced interval, and the optimization of the protocols is enhanced through utilization of the reduced interval.

The RIFS interval 202 is adjustable with respect to the modulation type of the frame and/or fragment. That is, because the SIFS interval 204 may vary with respect to the modulation type of a frame received by a destination station, the RIFS interval 202 similarly may vary such that it remains less than the SIFS interval 204. For example, when the modulation type for a frame is Complementary Code Keying (CCK), the RIFS interval 202 can be in a range from about 0 to about 8 microseconds; when the modulation type is Orthogonal Frequency Division Multiplexing (OFDM), the RIFS interval 202 can be in a range from about 0 to about 14 microseconds.

Under an RIFS mode of operation, transmitter overhead is reduced through sustaining the existing PHY layer configuration. Instances when the RIFS mode may not be suitable for use include when under adverse transmission conditions where coarse radio receiver settings may not be sustainable, such as when transmission power levels change from one frame to the next.

Another instance is when the MAC layer 150 will require an immediate, or prompt, response from the destination station (for example, an acknowledgment ACK frame, typically transmitted with a SIFS separation from the preceding transmission) and is unable to wait for an acknowledgement response at a later time. Another example is where the number of frames transmitted in RIFS mode exceed a predetermined amount—that is, a limitation may be placed upon the total duration of a sequence of transmissions which are separated by RIFS in order to periodically force the creation of an interval of medium idle time which is equal to or greater than a larger IFS (such as a Short IFS interval, as compared to a RIFS interval) to allow other devices (that are not in RIFS mode and that have transceivers that may not be able to decode the individual frames within a RIFS-separated transmission sequence) in a BSS to determine that communications are ongoing between stations, as well as to provide the opportunity for other devices to respond, if necessary.

Figure 6:
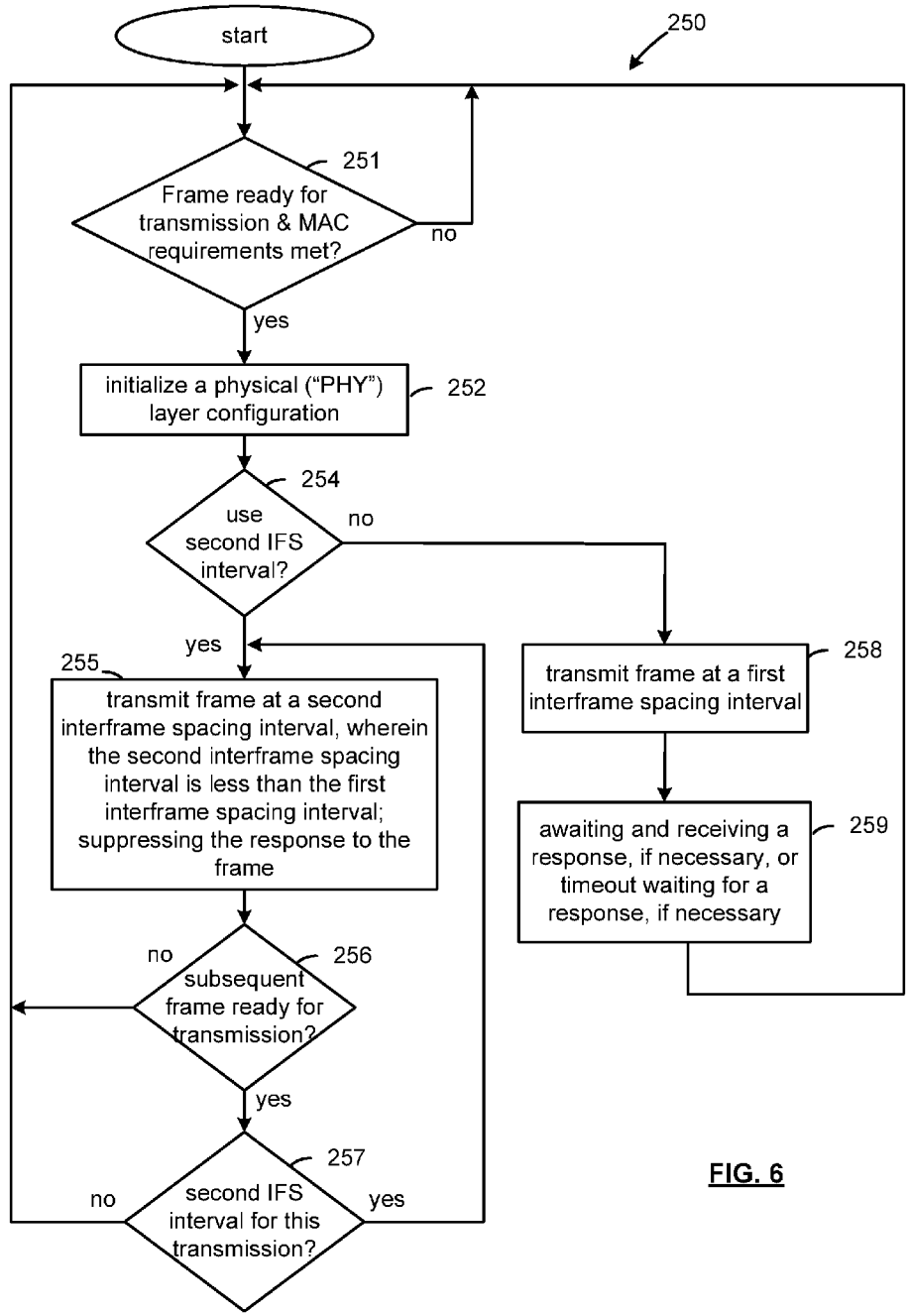
FIG. 6 is a flow chart that illustrates a method for transmission of a plurality of frames in a first and a second transmission mode according to one embodiment of the invention.

FIG. 6 is a flow chart that illustrates a method 250 for frame transmission in a first and a second transmission mode according to one embodiment of the invention. At step 251, a determination is made as to whether the frame is ready for transmission and the MAC requirements have been met. When yes, then the physical layer configuration for the transmitter is initialized at step 252. When the second IFS interval is to be used at step 254, then at step 255 the frame is transmitted at the second interframe spacing interval, and the response to the transmitted frame is suppressed.

The suppressed response, which is provided by the station receiving the transmitted frame, may be sent following a data packet burst as an aggregated response, or in the alternative, not provided at all to the transmitting station. With response suppression, the time otherwise associated with the tear-down/set-up cycle for the first transmission mode can be avoided using a transmission mode with the second IFS interval. Because a smaller, or discrete, amount of time is spent transmitting frames across the wireless medium, this also reduces the likely physical variation of the wireless medium, so that a previous configuration of the PHY layer may be used as a basis for further transmissions in an RIFS mode. Further, by suppressing the responses from a destination station to each frame, further time is reclaimed that can be devoted to increase the transmission rate and associated data rate from the radio.

When the first IFS interval is used at step 254, the frame is transmitted at the first interframe spacing interval at step 258. With respect to operation under IEEE 802.11, the first interframe spacing is a SIFS interval. The SIFS interval is used in the Point Coordinated Function mode and/or the Distributed Coordinated Function mode or in the Hybrid Coordination Function mode. Following the transmission of the frame at the first interframe spacing interval, the transmitting station waits for an acknowledgment response from the receiving station, as necessary, at step 259. Following receipt of the acknowledgement, or a time out condition, the next frame is readied for transmission at step 251.

In the second transmission mode, the second interframe spacing is a reduced interframe spacing (RIFS) interval. Accordingly, the plurality of frames are transmitted using the second interframe spacing interval, wherein the second interframe spacing is less than the first interframe spacing. The second transmission mode may be used with an access point (such as access points 12, 14, and/or 16), or among stations (for example, wireless communication devices 18 through 32).

Following transmission of the frame at step 255, a determination is made whether a subsequent frame is ready for transmission at step 256. When not, then at step 251, the determination is again made whether the frame is ready for transmission and whether the MAC requirements are met, and continues as earlier described. Otherwise, when the subsequent frame is ready, then a determination is made at 257 of whether the second IFS interval is used for the transmission. When yes, then the subsequent frame is transmitted at step 255 at the second interframe spacing interval, as discussed earlier. In this manner, the PHY layer configuration is not re-initialized, and is "sustained" during transmission of the subsequent frames transmitted at the second interframe spacing interval.

FIG. 7 illustrates a transmission signaling handshake of a transmitter in a first transmission mode between a MAC layer 150 and a physical (PHY) layer 152. In the first transmission mode, which is a non-RIFS mode, an SIFS interval 204 has priority for transmissions between stations, the MAC layer 150 initiates a transmission by providing to the PHY layer 152 a frame 01.

Upon transmitting the first frame, frame 01, at step 220, the PHY layer 152 is setup (coarse and fine setup) for transmission of frame 01. The PHY layer 152 responds, at step 222, to the MAC layer 150 with a frame 01 complete indication. Following the completion indication at step 222, the PHY layer 152 is torn-down in preparation for the next frame transmission or possible frame reception in the case of an anticipated response frame. The exchange continues for subsequent transmission of frames, or frame fragments. For example, the MAC layer 150 initiates a transmission by providing to the PHY layer 152 a subsequent frame 02 at step 224, upon which the PHY layer 152 is setup (coarse and fine setup) for transmission of frame 02, where the setup for the transmission of frame 02 might be the same as the setup required for the transmission of frame 01. Upon transmission of the frame 02, the PHY layer 152 responds at step 226 to the MAC layer 150 with a frame 02 complete indication. Following the completion indication at step 226, the PHY layer 152 is torn-down in preparation for another frame transmission or possible frame reception in the case of an anticipated response frame.

FIG. 8 illustrates a transmission signaling handshake of a transmitter in a second transmission mode between the MAC layer 150 and the physical (PHY) layer 152. In the second, or RIFS mode, a RIFS interval 202 has transmission priority between stations. When engaging in a RIFS mode, the transmitter of the radio 60 determines the capability of the destination station.

When a destination station can accommodate a reduced interframe spacing mode, (and other conditions do not frustrate the use of RIFS intervals), the MAC layer 150 initiates a transmission by providing to the PHY layer 152 a frame 01 at step 230. The PHY layer 152 is then set-up to transmit the frame 01, with an RIFS indicator. Because the transmitter is in a RIFS mode, the transmitter does not wait for an acknowledgement or response from the destination station before sending a subsequent frame and/or fragment.

The transmitter may be placed in an RIFS mode indicated from the MAC layer 150, or from the PHY layer 152. The RIFS indicator, when accompanying a frame from the MAC layer 150 to the PHY layer 152, that PHY layer 152 uses to provide an RIFS mode of operation. In the alternative, when the transmitter is capable of an RIFS mode of operation, the PHY layer 152 can provide an RIFS signal to the MAC 150 that indicates that a frame, or a plurality of frames, can be sent to the PHY 152 for RIFS transmission. Separately, the MAC layer 150 may provide signaling within the frame to suppress the destination station responses and/or acknowledgments to the RIFS frames, beginning with frame 01, to increase throughput. Alternatively, an explicit RIFS indicator is not necessary within the frame when a separate mechanism is used to suppress acknowledgements, in which case, the MAC layer 150 uses the acknowledgement suppressions to indicate to the PHY layer 152 what interframe spacing interval shall be used for transmission.

As a result, the MAC layer 150 may deliver frames and/or fragments to the PHY layer 152 at an increased rate, causing subsequent frame(s) to overlap a frame presently in the process of being transmitted to a destination station. That is, due to the increased throughput available from the shortened time interval in RIFS mode, which is less than a SIFS interval 204, the PHY layer 152 may not complete transmission of the first frame 01 before the MAC layer 150 delivers to the PHY layer 152 a subsequent frame (frame 02) for transmission. In the MAC layer 150 frame of reference, the frames delivered to the PHY layer 152 are considered as transmitted and completed.

To accommodate the overlapping frames delivered for transmission, the PHY layer 152 buffers the subsequent frame, for this example frame 02, until it can accommodate the transmission of the frame to the destination station. Further, because of the reduced time interval between frames and the increased throughput over the channel, minor variation of the channel characteristics would occur for the length of the transmission for a plurality of frames. In this regard the PHY layer 152, for transmission of subsequent frames, uses the previous transmission configuration. Also, the buffering of the frame may carry over issuance of the frame completion indications provided to the MAC layer 150. In this regard, as time lapses while the MAC layer 150 provides frames to the PHY layer 152, a greater frame transfer rate is realized with respect to operation under the handshake protocols implementing a SIFS interval (see FIG. 7).

Figure 9:
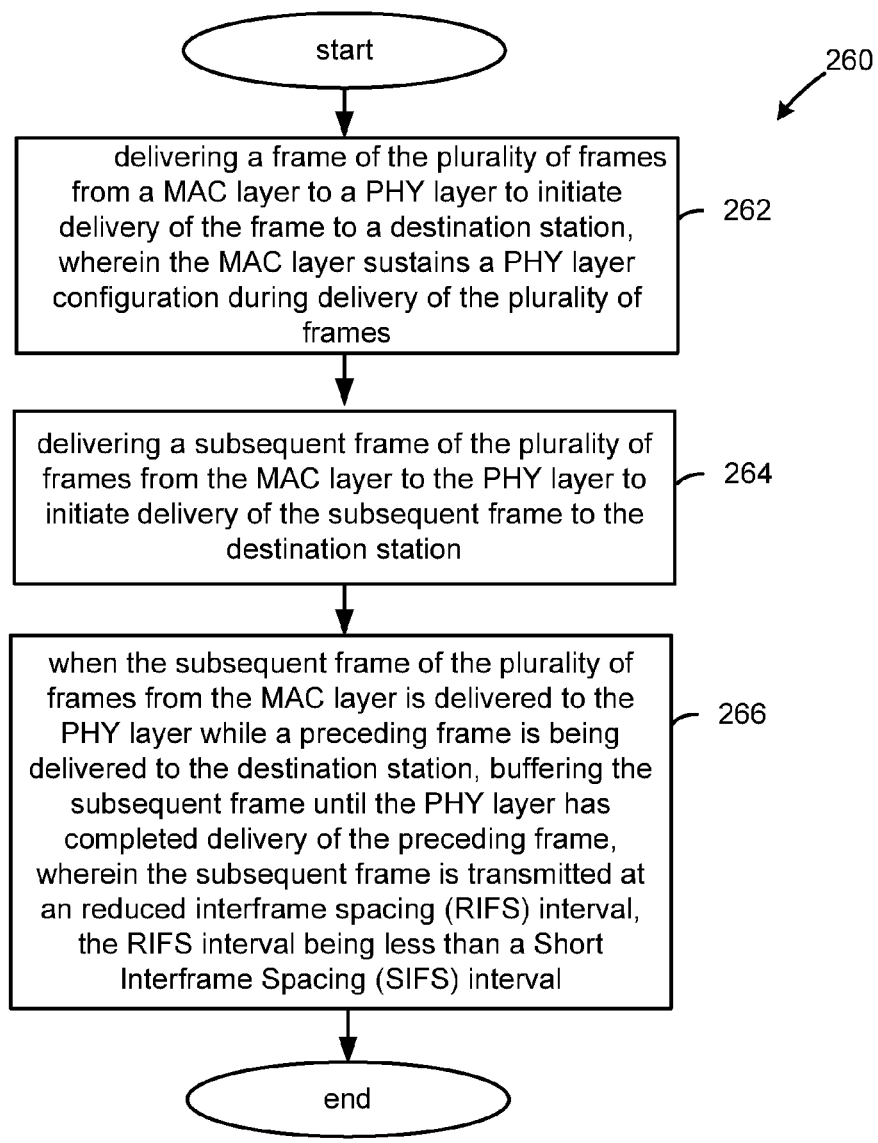
FIG. 9 illustrates a method for transmitting a plurality of frames to a destination station according to one embodiment of the invention.

FIG. 9 illustrates a method 260 for transmitting a plurality of frames to a destination station according to one embodiment of the invention. At step 262, a frame of the plurality of frames is delivered from a MAC layer to a PHY layer to initiate delivery of the frame to a destination station, wherein the MAC layer sustains a PHY layer configuration during delivery of the plurality of frames. A subsequent frame of the plurality of frames is then delivered, at step 264, from the MAC layer to the PHY layer to initiate delivery of the subsequent frame to the destination station. At step 266, buffering capabilities are provided wherein when the subsequent frame of the plurality of frames from the MAC layer is delivered to the PHY layer while a preceding frame is being delivered to the destination station, the subsequent frame is buffered (that is, stored temporarily in a cache and/or other memory device to accept the frames and/or fragment at one rate and delivers the frame and/or fragment over the air at another rate) until the PHY layer has completed delivery of the preceding frame. In this manner, the subsequent frame is transmitted at a reduced interframe spacing (RIFS) interval, which is less than a Short Interframe Spacing (SIFS) interval.

In the alternative, no buffering in the PHY layer may occur, and instead, the MAC layer can retain the subsequent frame. The MAC layer then begins to transfer of the frame to the PHY layer once the previous transmission has completed.

Figure 10:
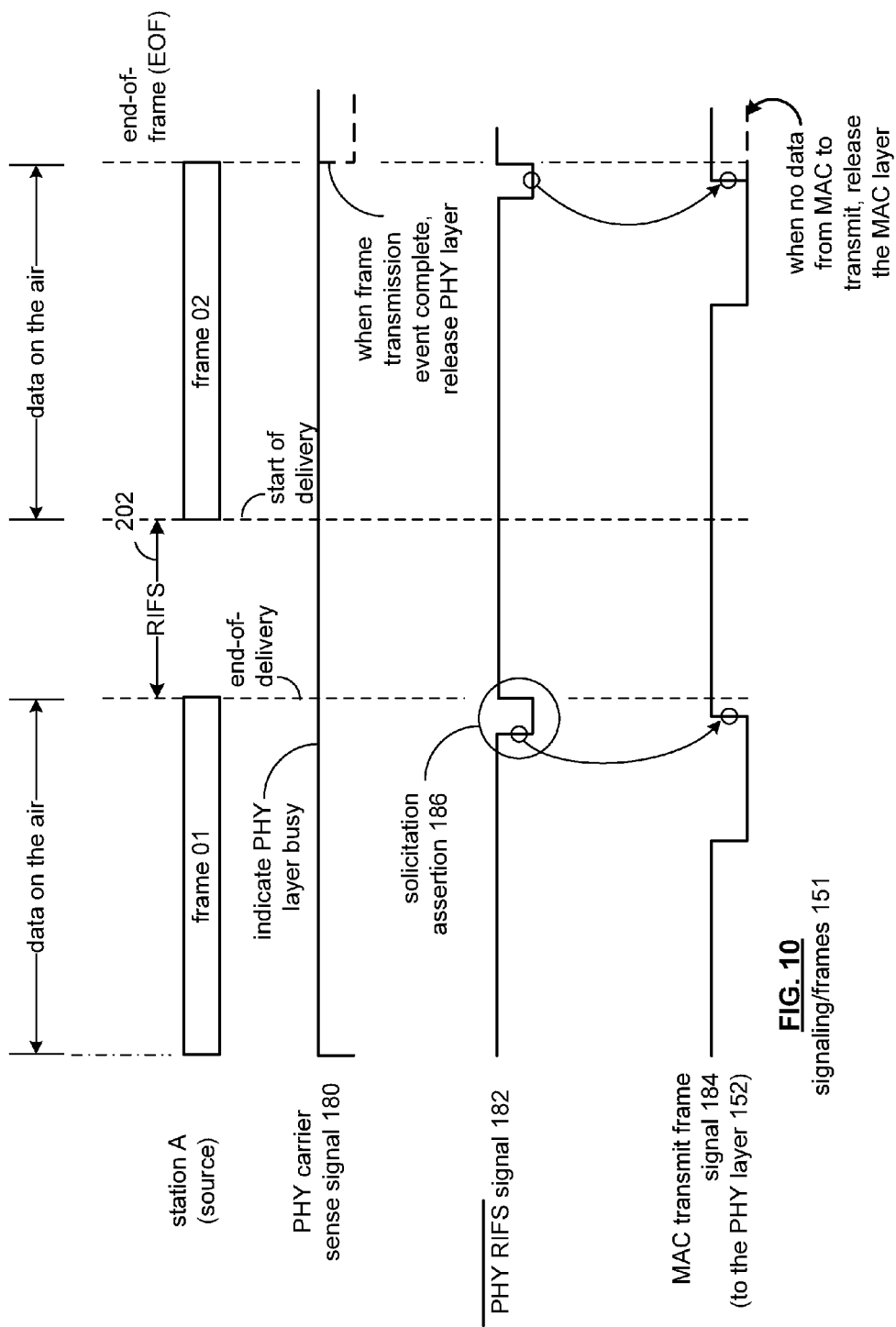
FIG. 10 illustrates a timing diagram of the MAC layer and PHY layer according to one embodiment of the invention.

FIG. 10 illustrates a timing diagram of the signaling portion of the signaling/frames 151 interaction between the MAC layer 150 and PHY layer 152 interface. Station A transmits a frame 01 and a subsequent frame 02 having a RIFS interval 202 separating the frames.

To accommodate networks with noisy channels, the frames may be fragmented into smaller pieces, each with its own checksum. The fragments are individually numbered and, under a non-RIFS mode, acknowledged using a stop-and-wait protocol. Fragmentation increases the throughput by restricting retransmissions to the bad fragments rather than the entire frame. The fragment size is not fixed by the standard specification but is a parameter of each station and can be adjusted according to dynamic local conditions.

With transmission of frame 01, a PHY carrier sense signal 180 is at a logic high, indicating the presence of the frame and that the PHY layer is "busy" or otherwise unavailable for the duration of the plurality of frames to be transmitted across the PHY layer. With the PHY carrier sense signal 180 indicating the PHY layer 152 as busy, the existing PHY layer 152 configuration is sustained and used for the transmission of the frames delivered from the MAC layer 150. The PHY RIFS signal 182, which is a shown as a negative-logic signal, is at a logic-high (negative logic signal is low) to solicit, via a solicitation assertion 186, the MAC layer 150 to deliver a frame for the PHY layer 152 to transmit in RIFS mode. The solicitation assertion 186 is at a logic-high as the end of delivery for the current frame becomes discernible, as by frame-size counters, etc. When the MAC layer 150 has a frame to deliver to the PHY layer 152, the MAC transmit frame 184 is at a logic high, and then goes to logic low following the delivery of the frame to the PHY layer 152. In general, the MAC dictates the use of the RIFS transmission mode to the PHY layer. With the PHY RIFS signal 182 at a logic high, the MAC layer 150 provides a transmit frame signal 184 to the PHY layer 152, prompting the PHY layer 152 to transmit the frame or frame fragment to a destination station using RIFS spacing.

Figure 11:
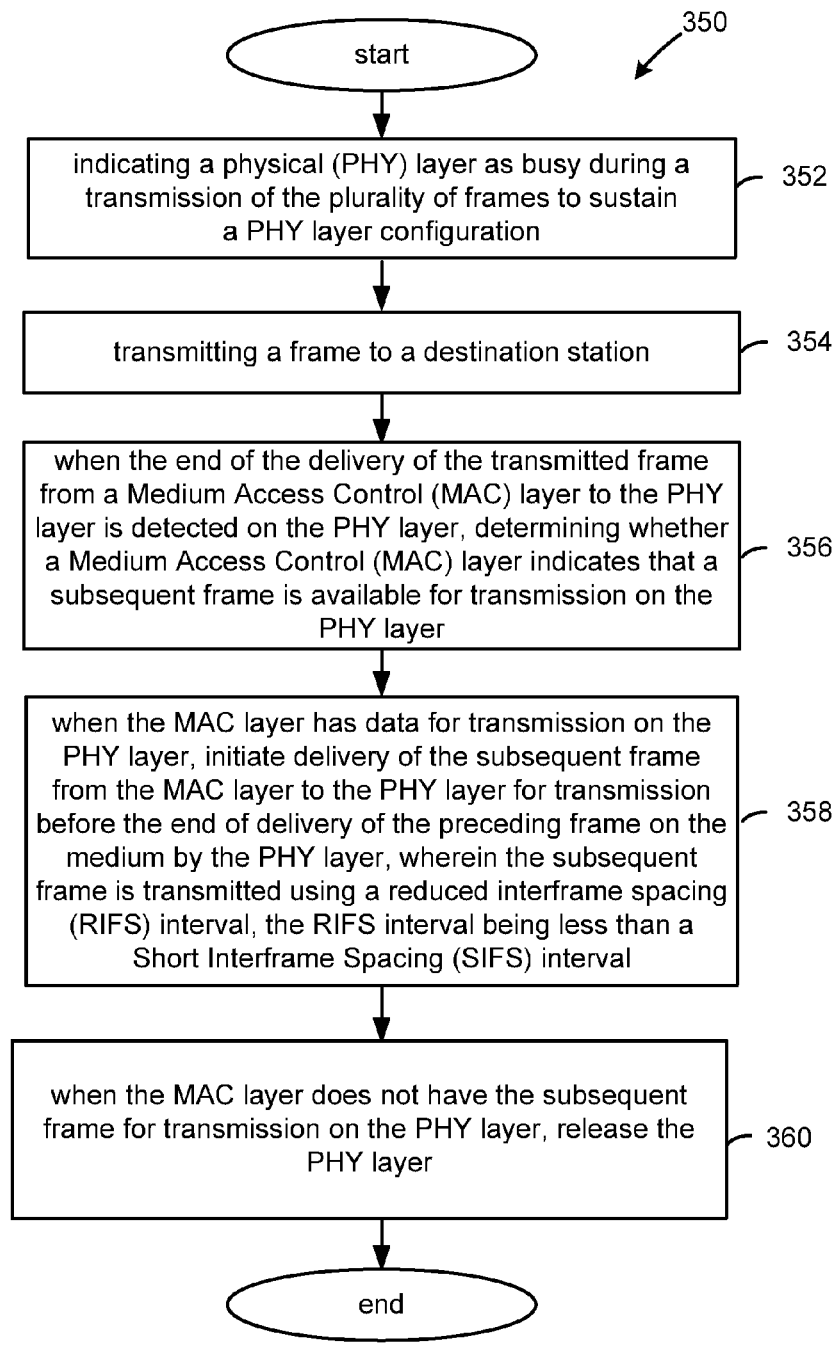
FIG. 11 is a flow chart that illustrates a method for transmitting a plurality of frames with a reduced interframe spacing (RIFS) interval according to one embodiment of the invention.

FIG. 11 illustrates a method 350 for transmitting a plurality of frames with a reduced interframe spacing (RIFS) interval. The method 350 refers to the interaction between the MAC layer 150 and the PHY layer 152 in providing the frames for transmission to a destination station. Each frame of the plurality of frames includes a start-of-frame and an end-of frame. At step 352, the physical (PHY) layer is indicated as busy during a transmission of the plurality of frames. For example, the PHY carrier sense signal 180 is held at a logic high to sustain the indicated transmission state of the PHY layer 152 for the duration of the transmission of the plurality of frames.

The frame is transmitted, at step 354, to a destination station (for example, a wireless communication device 18-32 (see FIG. 1). At step 356, as an end-of-delivery for the first frame becomes discernible, the Medium Access Control (MAC) layer is solicited for a subsequent frame, or frame fragment, for transmission on the PHY layer. The MAC layer does not wait for a "frame complete" message from the PHY layer before delivering a subsequent frame to the PHY layer. Without the RIFS interval, the MAC layer receives a "frame complete" message from the PHY layer before providing a subsequent frame to the PHY layer. In this manner, the MAC layer can provide frames at a sufficiently increased rate to provide "data on the air" using a reduced interframe spacing interval. At step 358, when the MAC layer has the subsequent frame available, delivery of the subsequent frame is initiated from the MAC layer to the PHY layer for transmission before the end-of-delivery for the transmitted frame. When, at step 360, the MAC layer does not have the subsequent frame for transmission on the PHY, the PHY layer and the MAC layer are released.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that a first signal has a greater magnitude than a second signal, a favorable comparison may be achieved when the magnitude of the first signal is greater than that of the second signal or when the magnitude of the second signal is less than that of the first signal.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

What is claimed is:

1. A method for increasing throughput in a wireless transmission comprises:
    transmitting a plurality of frames using a Reduced InterFrame Spacing (RIFS) interval, wherein the RIFS interval is less than a Short InterFrame Spacing (SIFS) interval, the transmitting of the plurality of frames using the RIFS interval includes:
        sustaining an operating configuration of a physical ("PHY") layer during the transmission of the plurality of frames, wherein when a subsequent frame of the plurality of frames from a Medium Access Control (MAC) layer is delivered to the PHY layer while a preceding frame delivery is in process, buffering the subsequent frame until the PHY layer completes delivery of the preceding frame;
        providing a response suppression instruction to suppress responses to each transmitted frame of the plurality of frames; and
        causing the PHY layer to transmit each frame of the plurality of frames at the RIFS interval.

2. The method of claim 1, wherein the response suppression instruction comprises at least one of:
    complete suppression of responses for the each transmitted frame of the plurality of frames; and
    delaying responses for the each transmitted frame of the plurality of frames.

3. The method of claim 2 wherein the providing the response suppression instruction to suppress responses to the each transmitted frame of the plurality of frames comprises:
    an RIFS indicator carried by the each transmitted frame.

4. The method of claim 3, wherein the RIFS indicator includes an ACK response instruction.

5. The method of claim 2 wherein the providing the response suppression instruction to suppress responses to the each transmitted frame of the plurality of frames comprises:
    transmitting an ACK response instruction.

6. The method of claim 1 further comprising:
    receiving a response to the response suppression instruction.

7. The method of claim 1, further comprising:
    when the subsequent frame is unavailable, releasing the operating configuration of the PHY layer.

8. A method for a device to wirelessly transmit a plurality of frames using a Reduced InterFrame Spacing (RIFS) interval being less than a Short InterFrame Spacing (SIFS) interval, the method comprising:
    indicating a physical (PHY) layer of a transmitter as busy to sustain a PHY configuration of the transmitter during transmission of the plurality of frames, wherein the PHY configuration includes a coarse transmitter setup;
    transmitting a frame through the PHY layer;
    when an end of delivery of the transmitted frame from a Medium Access Control (MAC) layer of the transmitter to the PHY layer is detected on the PHY layer, determining whether the MAC layer indicates that a subsequent frame of the plurality of frames is available for transmission; and when the subsequent frame is available, initiating delivery of the subsequent frame from the MAC layer to the PHY layer for transmission before the end of delivery for the transmitted frame by the PHY layer, wherein the subsequent frame is transmitted using the RIFS interval.

9. The method of claim 8 wherein the step of indicating the PHY layer as busy comprises asserting a PHY carrier sense signal to sustain the PHY configuration.

10. The method of claim 8 wherein delivery of the frame from the MAC layer to the PHY layer further comprises indicating the delivery with a MAC transmit frame signal.

11. The method of claim 8 wherein releasing the PHY layer includes the PHY layer placing a PHY carrier sense signal at a logic low.

12. The method of claim 8 wherein the plurality of frames include a frame fragment.

13. The method of claim 8, further comprising:
when the subsequent frame is unavailable, releasing the PHY configuration of the PHY layer.

14. The method of claim 8 wherein the frame includes an RIFS indicator.

15. The method of claim 14, wherein the RIFS indicator includes an ACK response instruction.

16. Apparatus for wirelessly transmitting a plurality of frames using a Reduced InterFrame Spacing (RIFS) interval being less than a Short InterFrame Spacing (SIFS) interval, each frame of the plurality of frames including a start-of-frame and an end-of-frame, the apparatus functions to:
indicate a physical (PHY) layer as busy during a transmission of the plurality of frames to sustain a PHY layer configuration, wherein the PHY layer configuration includes a coarse transmitter setup;
transmit a first frame;
when an end of the delivery of the first frame from a Medium Access Control (MAC) layer to the PHY layer is detected on the PHY layer, determining whether a Medium Access Control (MAC) layer indicates that a subsequent frame is available for transmission on the PHY layer; and
when the MAC layer has data for transmission on the PHY layer, initiate delivery of the subsequent frame from the MAC layer to the PHY layer for transmission before the end of delivery of the first frame by the PHY layer, wherein the subsequent frame is transmitted using the RIFS interval.

17. The apparatus of claim 16 wherein the function to indicate the PHY layer as busy further prompts the apparatus to:
assert a PHY carrier sense signal.

18. The apparatus of claim 16 wherein the delivery of the frame from the MAC to the PHY layer further comprises:
indicating the delivery with a MAC transmit frame signal.

19. The apparatus of claim 16 wherein releasing the PHY layer includes the PHY layer placing a PHY carrier sense signal at a logic low.

20. The apparatus of claim 16 further functions to:
release the sustained PHY configuration of the PHY layer when the MAC layer does not have the subsequent frame for transmission on the PHY layer.

* * * * *